United States Patent [19]
Buswell et al.

[11] Patent Number: 5,750,076
[45] Date of Patent: May 12, 1998

[54] APPARATUS FOR THE TWO-STAGE SELECTIVE OXIDATION OF CARBON MONOXIDE IN A HYDROGEN-CONTAINING GAS MIXTURE

[75] Inventors: Richard F. Buswell, Glastonbury, Conn.; Ronald Cohen, Boca Raton, Fla.; Leonard McNeilly, Burnaby; David S. Watkins, Coquitlam, both of Canada

[73] Assignee: Ballard Power Systems Inc., Burnaby, Canada

[21] Appl. No.: 580,078

[22] Filed: Dec. 20, 1995

Related U.S. Application Data

[62] Division of Ser. No. 293,653, Aug. 22, 1994, Pat. No. 5,518,705.

[51] Int. Cl.$^6$ ............... F16K 17/00; G01D 7/00; F01N 3/10; B01D 50/00
[52] U.S. Cl. ............... 422/115; 422/173; 422/177
[58] Field of Search ............... 422/177, 171, 422/173, 115; 423/437 M

[56] References Cited

U.S. PATENT DOCUMENTS

| | | | |
|---|---|---|---|
| 3,976,506 | 8/1976 | Landau | 136/86 |
| 3,982,962 | 9/1976 | Bloomfield | 429/19 |
| 4,046,956 | 9/1977 | Fanciullo | 429/20 |
| 4,587,114 | 5/1986 | Hirai et al. | 423/247 |
| 4,604,275 | 8/1986 | Murib | 423/437 |
| 4,716,023 | 12/1987 | Christner et al. | 422/149 |
| 4,910,099 | 3/1990 | Gottesfeld | 429/13 |
| 5,271,916 | 12/1993 | Vanderborgh et al. | 423/246 |
| 5,330,727 | 7/1994 | Trocciola et al. | 422/177 |
| 5,432,021 | 7/1995 | Wilkinson et al. | 429/17 |
| 5,436,086 | 7/1995 | Seymour et al. | 429/17 |
| 5,482,680 | 1/1996 | Wilkinson et al. | 422/177 |
| 5,501,781 | 3/1996 | Hsu et al. | 204/269 |

*Primary Examiner*—Nina Bhat
*Attorney, Agent, or Firm*—McAndrews, Held & Malloy, Ltd.

[57] ABSTRACT

An apparatus for the two-stage selective oxidation of carbon monoxide to carbon dioxide in a fuel stream comprising hydrogen and carbon monoxide. The apparatus includes primary and secondary reaction chambers, which deliver a hydrogen-rich outlet gas stream having a carbon monoxide concentration of less than about 5 ppm. When an increase in the carbon monoxide concentration in the outlet stream of the primary reaction chamber is detected, then the flow through the primary reaction chamber is reversed. The selective oxidizer employs a temperature-based control strategy as an oxygen-containing gas stream flow rate adjustment around the flow rate initially set in direct proportion to the fuel gas stream flow rate. The control strategy regulates the amount of oxygen-containing gas mixed with the gaseous fuel stream as a function of the difference between the temperature at a location at or near the end of the primary reaction chamber and the temperature at the outlet of the primary reaction chamber.

14 Claims, 4 Drawing Sheets

APPARATUS FOR THE TWO-STAGE SELECTIVE OXIDATION OF CARBON MONOXIDE IN A HYDROGEN-CONTAINING GAS MIXTURE

This is a division of U.S. patent application Ser. No. 08/293,653 filed Aug. 22, 1994, now U.S. Pat. No. 5,518,705.

FIELD OF THE INVENTION

The present invention relates to a method and apparatus for selectively oxidizing the carbon monoxide present in a mixture of gases, including hydrogen, to carbon dioxide. In the present invention, a two-stage selective oxidation process is used to counteract the blanketing effects of the selective oxidation catalyst active sites by carbon monoxide and to maintain the concentration of carbon monoxide in the outlet gas stream well below 10 parts per million ("ppm").

BACKGROUND OF THE INVENTION

Electrochemical fuel cells convert fuel and oxidant to electricity and reaction product. In electrochemical fuel cells employing hydrogen as the fuel and oxygen as the oxidant, the reaction product is water. Recently, efforts have been devoted to identifying ways to operate electrochemical fuel cells using other than pure hydrogen as the fuel. Fuel cell systems operating on pure hydrogen are generally disadvantageous because of the expense of producing and storing pure hydrogen gas. In addition, the use of liquid fuels is preferable to pure, bottled hydrogen in some mobile and vehicular applications of electrochemical fuel cells.

Recent efforts have focused on the use of impure hydrogen obtained from the chemical conversion of hydrocarbon and oxygenated fuels to hydrogen. However, to be useful for fuel cells and other similar hydrogen-based chemical applications, these fuels must be efficiently converted to relatively pure hydrogen with a minimal amount of undesirable chemical by-products, such as carbon monoxide.

Conversion of hydrocarbons and oxygenated fuels such as methanol to hydrogen is generally accomplished through steam reformation in a reactor commonly referred to as a catalytic reformer. The steam reformation of methanol is represented by the following chemical equation:

$$CH_3OH + H_2O + heat \rightleftharpoons 3H_2 + CO_2 \tag{1}$$

Due to competing reactions, the initial gaseous mixture produced by steam reformation of methanol typically contains from about 0.5% to about 20% by volume of carbon monoxide and about 65% to about 75% hydrogen, along with about 10% to about 25% carbon dioxide on a dry basis (in addition, water vapor can be present in the gas stream). The initial gas mixture produced by the steam reformer can be further processed by a shift reactor (sometimes called a shift converter) to reduce the carbon monoxide content to about 0.2% to about 2%. The catalyzed reaction occurring in the shift converter is represented by the following chemical equation:

$$CO + H_2O \rightleftharpoons CO_2 + H_2 \tag{2}$$

Even after a combination of steam reformer/shift converter processing, the product gas mixture will have minor amounts of carbon monoxide and various hydrocarbon species, each present at about 1% or less of the total product mixture. A variety of conventional treatment processes may be employed to remove many of the hydrocarbon and acid gas impurities generated during the steam reformer/shift converter process. However, such conventional treatment methods are generally incapable of reducing the carbon monoxide content of the gases much below 0.2%.

In low temperature, hydrogen-based fuel cell applications, the presence of carbon monoxide in the inlet hydrogen stream, even at the 0.1% to 1% level, is generally unacceptable. In solid polymer electrolyte fuel cells, the electrochemical reaction is typically catalyzed by an active catalytic material comprising a nobel metal such as platinum. Carbon monoxide absorbs preferentially to the surface of platinum, effectively poisoning the catalyst and significantly reducing the efficiency of the desired electrochemical reaction. Thus, the amount of carbon monoxide in the hydrogen-containing gas mixture produced by a steam reformer/shift converter process for use in electrochemical fuel cells should be minimized, preferably to an amount significantly lower than the approximately 1% achieved using conventional steam reformation methods. The present selective oxidizing method and apparatus reduce the amount of carbon monoxide in a hydrogen-containing gas stream to a level suitable for use in electrochemical fuel cells, generally significantly less than 100 ppm.

In the present selective oxidizing method and apparatus, it is believed that at least three competing reactions occur, which are represented by the following chemical equations:

1. The desired oxidation of carbon monoxide to carbon dioxide:

$$CO + \tfrac{1}{2}O_2 \rightleftharpoons CO_2 \tag{3}$$

2. The undesired oxidation of hydrogen to water:

$$H_2 + \tfrac{1}{2}O_2 \rightleftharpoons H_2O \tag{4}$$

3. The undesired reverse water gas shift reaction:

$$CO_2 + H_2 \rightleftharpoons H_2O + CO \tag{5}$$

One of the most commonly used selective oxidizer designs uses an adiabatic catalyst bed to react the carbon monoxide with oxygen supplied by an oxygen-containing gas (e.g., air). Catalyst loading, bed space velocity, and air flow are selected to control the temperatures in the bed so that bed size is minimized while the selectivity of the reaction to consume carbon monoxide is maximized.

Performance of the selective oxidizer catalyst gradually decays due to the gradual blanketing of the catalyst active sites with carbon monoxide. After a period of time, this decrease in catalyst performance caused by carbon monoxide results in a rapid increase in the carbon monoxide concentration of the selective oxidizer exit gas stream which is fed as the inlet stream to the fuel cell assembly. In conventional selective oxidation methods, blanketing of the selective oxidizer catalyst by carbon monoxide can be compensated for by increasing the catalyst bed temperature. However, while an increase in the bed temperature helps to compensate for the loss of catalyst activity, it also results in the loss of reaction selectivity, and thus increased hydrogen consumption which is highly undesirable in fuel cell applications.

SUMMARY OF THE INVENTION

In a first embodiment of the apparatus for selectively oxidizing carbon monoxide to carbon dioxide in a fuel stream comprising hydrogen and carbon monoxide, the apparatus comprises:

(a) a primary reaction chamber having disposed therein an amount of catalyst for promoting oxidation of carbon monoxide to carbon dioxide and further comprising a first inlet and a second inlet;

(b) a second reaction chamber having disposed therein an amount of catalyst for promoting oxidation of carbon monoxide to carbon dioxide and further comprising a first outlet, the second reaction chamber in fluid communication with the primary reaction chamber, and the first outlet in fluid communication with the first inlet through at least a portion of each of the first and second reaction chambers;

(c) a third reaction chamber having disposed therein an amount of catalyst for promoting oxidation of carbon monoxide to carbon dioxide and further comprising a second outlet, the third reaction chamber in fluid communication with the first reaction chamber, and the second outlet in fluid communication with the second inlet through at least a portion of each of the first and third reaction chambers;

(d) a first valve means for rendering the second inlet and the second outlet substantially impassable to fluid flow when the first inlet and the first outlet are passable to fluid flow; and (e) a second valve means for rendering the first inlet and the first outlet substantially impassable to fluid flow when the second inlet and the second outlet are passable to fluid flow.

In the preferred first embodiment, the first inlet receives a fluid stream from a first gaseous fuel stream inlet and a fluid stream from a first oxygen-containing gas stream inlet, and the second inlet receives a fluid stream from a second gaseous fuel stream inlet and a fluid stream from a second oxygen-containing gas stream inlet.

In a second embodiment of the apparatus for selectively oxidizing carbon monoxide to carbon dioxide in a fuel stream comprising hydrogen and carbon monoxide, the apparatus comprises:

(a) a primary reaction chamber having disposed therein an amount of catalyst for promoting oxidation of carbon monoxide to carbon dioxide and further comprising a first inlet, a second inlet, a first outlet, and a second outlet, wherein the first inlet is in fluid communication with the first outlet and the second inlet is in fluid communication with the second outlet;

(b) a secondary reaction chamber having disposed therein an amount of catalyst for promoting carbon monoxide to carbon dioxide and further comprising a secondary inlet and a secondary outlet, wherein the secondary outlet is in fluid communication with each of the first inlet and the second inlet;

(c) a first valve means for rendering the second inlet and the second outlet substantially impassable to fluid flow when the first inlet and the first outlet are passable to fluid flow;

(d) a second valve means for rendering the first inlet and the first outlet substantially impassable to fluid flow when the second inlet and the second outlet are passable to fluid flow.

In the second preferred embodiment, the first inlet receives a fluid stream from a first gaseous fuel stream inlet and a fluid stream from a first oxygen-containing gas stream inlet, and the second inlet receives a fluid stream from a second gaseous fuel stream inlet and a fluid stream from a second oxygen-containing gas stream inlet. The secondary inlet optionally receives a fluid stream from an oxygen-containing gas stream inlet. The secondary inlet optionally has a heat exchanger interposed therein.

In a third embodiment of the apparatus for selectively oxidizing carbon monoxide to carbon dioxide in a fuel stream comprising hydrogen and carbon monoxide, the apparatus comprises:

(a) a primary reaction chamber having disposed therein an amount of catalyst for promoting oxidation of carbon monoxide to carbon dioxide and further comprising a first primary inlet, a second primary inlet, a first primary outlet, and a second primary outlet, wherein the first primary inlet is in fluid communication with the first primary outlet and the second primary inlet is in fluid communication with the second primary outlet;

(b) a first secondary reaction chamber having disposed therein an amount of catalyst for promoting oxidation of carbon monoxide to carbon dioxide and further comprising a first secondary inlet and a first secondary outlet, wherein the first secondary outlet is in fluid communication with each of the first primary inlet and the first secondary inlet;

(c) a second secondary reaction chamber having disposed therein an amount of catalyst for promoting oxidation of carbon monoxide to carbon dioxide and further comprising a second secondary inlet and a second secondary outlet, wherein the second secondary outlet is in fluid communication with each of the second primary inlet and the second secondary inlet;

(d) a first valve means for rendering the second primary inlet and the second primary outlet substantially impassable to fluid flow when the first primary inlet and the first primary outlet are passable to fluid flow;

(e) a second valve means for rendering the first primary inlet and the first primary outlet substantially impassable to fluid flow when the second primary inlet and the second primary outlet are passable to fluid flow.

In the preferred third embodiment, the first primary inlet receives a fluid stream from a first gaseous fuel stream inlet and a fluid stream from a first oxygen-containing gas stream inlet, and the second primary inlet receives a fluid stream from a second gaseous fuel stream inlet and a fluid stream from a second oxygen-containing gas stream inlet. Each of the first and second secondary inlets optionally receives a fluid stream from an oxygen-containing gas stream inlet. Each of the first and second secondary inlets optionally has a heat exchanger interposed therein.

In a preferred method for controlling the rate of selective oxidation of carbon monoxide to carbon dioxide in a fuel stream comprising hydrogen and carbon monoxide introduced to a reaction chamber having disposed therein an amount of catalyst for promoting oxidation of carbon monoxide to carbon dioxide, the apparatus further comprising a fuel stream inlet, an oxygen-containing gas stream inlet having a valve for regulating flow therethrough, an outlet, a first thermocouple for measuring the temperature of the reaction chamber near the outlet, and a second thermocouple for measuring the temperature within the outlet, the method comprises:

(a) measuring the flow rate of the fuel gas stream introduced to the reaction chamber at the fuel stream inlet;

(b) actuating the oxygen-containing gas stream inlet valve such that an amount of oxygen-containing gas is introduced to the reaction chamber at a flow rate in direct proportion to the flow rate of the fuel gas stream as measured in step (a);

(c) actuating the oxygen-containing gas stream inlet valve to increase the flow rate of the oxygen-containing gas stream into the reaction chamber from the flow rate established in step (b) when the difference between the temperature measured by the first thermocouple and the temperature measure by the second thermocouple is greater than a pre-set control temperature difference; and (d) actuating the oxygen-containing gas stream inlet valve to decrease the flow rate of the oxygen-containing gas stream into the reaction chamber from the flow rate established in step (b) when the difference between the temperature measured by the first thermocouple and the temperature measure by the second thermocouple is less than a pre-set control temperature difference.

The selective oxidizer described herein is capable of delivering hydrogen-rich gas with a carbon monoxide concentration of less than about 5 ppm. When an increase in the carbon monoxide concentration in the exit stream from the primary reaction chamber is detected, due to carbon monoxide blanketing of the catalyst, then the flow through the primary reaction chamber is reversed. This flow reversal has the effect of regenerating the catalyst by counteracting carbon monoxide blanketing in the catalyst. However, because the inlet gas, which may contain up to 2000 ppm of carbon monoxide, is exhausted via the bed outlet when the flow is reversed, there is a surge in the concentration of carbon monoxide in the outlet process gas stream which may last from about 10 to about 30 seconds. To prevent this carbon monoxide rich gas from being introduced to the fuel cell assembly and poisoning the catalyst therein, at least one additional, secondary reaction chamber or catalyst bed is provided after the primary reaction chamber to oxidize the carbon monoxide in the surge gas stream.

The present selective oxidizer utilizes a temperature-based control strategy as an oxygen-containing gas stream flow rate adjustment around the flow rate initially set in direct proportion to the fuel gas stream flow rate. The control strategy regulates the amount of oxygen-containing gas mixed with the gaseous fuel stream as a function of the difference between the temperature at a location at or near the end of the primary reaction chamber and the temperature at the outlet of the primary reaction chamber. Changing the amount of oxygen-containing gas mixed with the inlet gaseous fuel stream changes the reaction activity profile over the bed length. If the amount of oxygen-containing gas is increased for a fixed gaseous fuel stream flow, the reaction rate is increased toward the beginning of the primary reaction chamber or bed, thereby causing the temperature increase in this region of the primary reaction chamber to be substantially greater than the temperature increase at the reactor outlet. Similarly, if the amount of oxygen-containing gas is decreased for a fixed gaseous fuel stream flow, the reaction rate is decreased toward the beginning of the primary reaction chamber, thereby causing the temperature increase in this region to be close to the temperature increase at the reactor outlet.

The temperatures near the end of the primary reaction chamber and at the outlet of the primary reaction chamber are preferably measured by thermocouples located in each region. The thermocouple used to detect the temperature near the end of the primary reaction chamber is preferably located between about 60% and about 90% of the bed length away from the inlet. Most preferably, the thermocouple located near the end of the primary reaction chamber is at a position about 90% of the bed length away from the inlet, and the outlet thermocouple is located in the reactor outlet gas stream outside the primary reaction chamber.

DETAILED DESCRIPTION OF THE PREFERRED EMBODIMENTS

Figure 1:
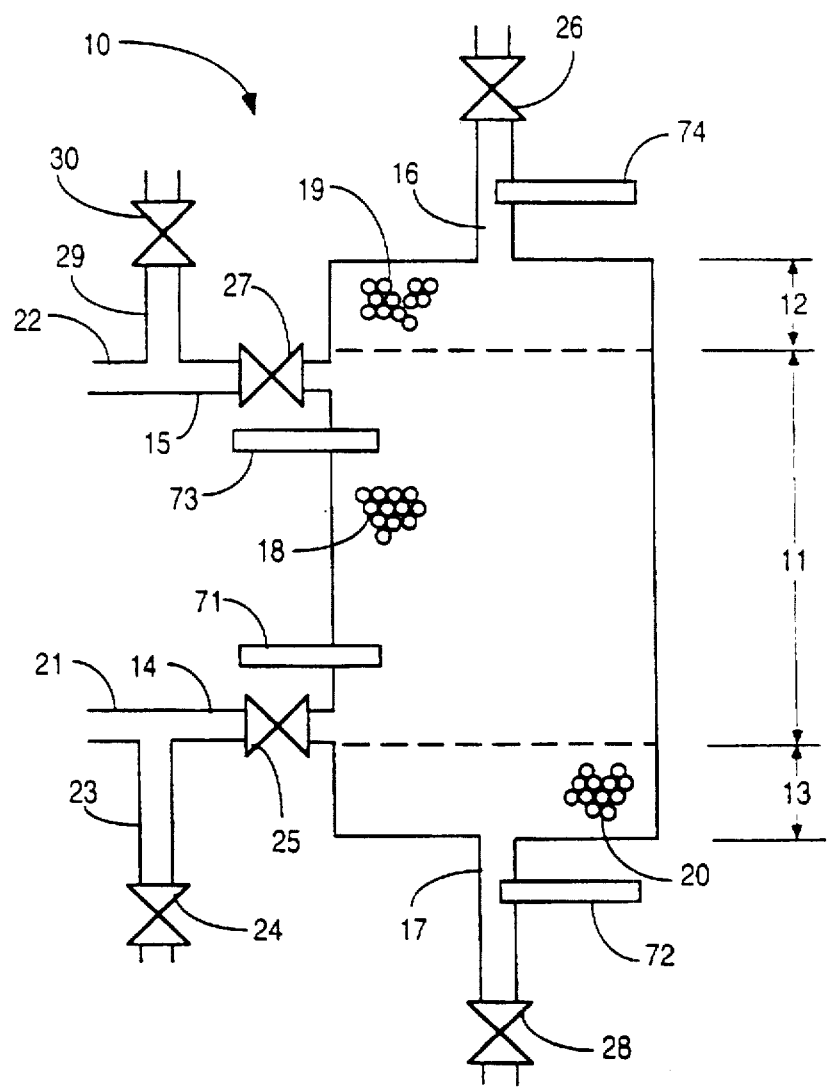
FIG. 1 is a schematic diagram of a first embodiment of the selective oxidation apparatus in which both the primary and secondary reaction chambers are commonly housed.

Turning first to FIG. 1, a schematic diagram shows selective oxidizer apparatus 10, which comprises three reaction chambers or fixed catalyst beds. Primary reaction chamber or bed 11 has an amount of selective oxidation catalyst 18 disposed therein, and is in fluid communication with second reaction chamber 12 and third reaction chamber 13, each having disposed therein amounts of selective oxidation catalyst 19 and 20, respectively. In addition, selective oxidizer 10 has a first gaseous fuel stream inlet conduit 21, a first oxygen-containing gas stream inlet conduit 23, a first outlet conduit 16, a second gaseous fuel stream inlet conduit 22, a second oxygen-containing gas stream inlet conduit 29, and a second outlet conduit 17. Control valve 24 regulates the flow through first oxygen-containing gas stream inlet conduit 23. Control valve 26 regulates the flow through first outlet conduit 16. Control valve 30 regulates the flow through second oxygen-containing gas stream inlet conduit 29. Control valve 28 regulates the flow through second outlet conduit 17.

As shown in FIG. 1, a first inlet conduit 14 provides a fluid connection between first inlet conduits 21, 23 and primary reaction chamber 11. Similarly, a second inlet conduit 15 provides a fluid connection between second inlet conduits 22, 29 and primary reaction chamber 11. Control valve 25 regulates the flow through first inlet conduit 14. Control valve 27 regulates the flow through second inlet conduit 15.

In operation, a gaseous fuel stream comprising hydrogen and carbon monoxide flowing through first gaseous fuel stream inlet conduit 21, typically a tube or pipe, is mixed with an amount of oxygen-containing gas fed through first oxygen-containing gas stream inlet conduit 23. The mixture of the gaseous fuel stream and the oxygen-containing gas stream is fed into primary reaction chamber 11 through first gaseous fuel stream inlet conduit 14, and is contacted with at least a portion of the amount of selective oxidation catalyst 18 disposed in reaction chamber 11. Once the gaseous fuel stream mixture has been directed through reaction chamber 11, the gaseous fuel stream, which at that point has a very low carbon monoxide concentration due to its having undergone selective oxidation, is directed through second reaction chamber 12 and exits selective oxidizer 10 through first outlet conduit 16. The flow through first outlet conduit 16 is regulated by control valve 26.

When an increase in carbon monoxide concentration of the gaseous fuel stream exiting selective oxidizer 10 due to carbon monoxide blanketing of selective oxidation catalyst 18 is detected, then the flow through selective oxidizer 10 is reversed. The control strategy of selective oxidizer 10, a schematic diagram of which is provided in FIG. 4 and is discussed below, reverses the flow through selective oxidizer 10 by causing control valve 25 and control valve 26 to close while simultaneously causing control valve 27 and control valve 28 to open, both of which had previously been in the closed position. Control valve 27 regulates the flow through second inlet conduit 15. Control valve 28 regulates the flow through second outlet conduit 17.

When the flow is reversed, the gaseous fuel stream comprising hydrogen and carbon monoxide is directed through second gaseous fuel stream inlet conduit 22 and is mixed with an amount of oxygen-containing gas fed through second oxygen-containing gas stream inlet conduit 29. Control valve 30 regulates the flow of the oxygen-containing gas stream through inlet conduit 29. The mixture of the gaseous fuel and oxygen-containing gas streams is fed into primary reaction chamber 11 through second inlet conduit 15, and is contacted with at least a portion of the amount of selective oxidation catalyst 18 disposed in reaction chamber 11.

Immediately after the flow through selective oxidizer 10 is reversed, the portion of the gaseous fuel stream initially exiting primary reaction chamber 11 has a relatively high carbon monoxide concentration (e.g., 2000 ppm) because at the point of flow reversal it had not yet contacted selective oxidation catalyst 18. Therefore, an amount of selective oxidation catalyst 20 disposed in third reaction chamber 13 is necessary to oxidize this as-yet unreacted carbon monoxide and to prevent a fuel gas stream having a high carbon monoxide concentration from exiting selective oxidizer 10.

It has been found that reversing the flow through selective oxidizer 10 has the effect of counteracting carbon monoxide blanketing and substantially returning selective oxidation catalyst 18 to its original activity. However, over time, carbon monoxide blanketing of selective oxidation catalyst 18 in reaction chamber 11 will reoccur, and the flow through selective oxidizer 10 will need to be reversed again. The flow may thus be iteratively reversed as often as necessary.

Figure 4:
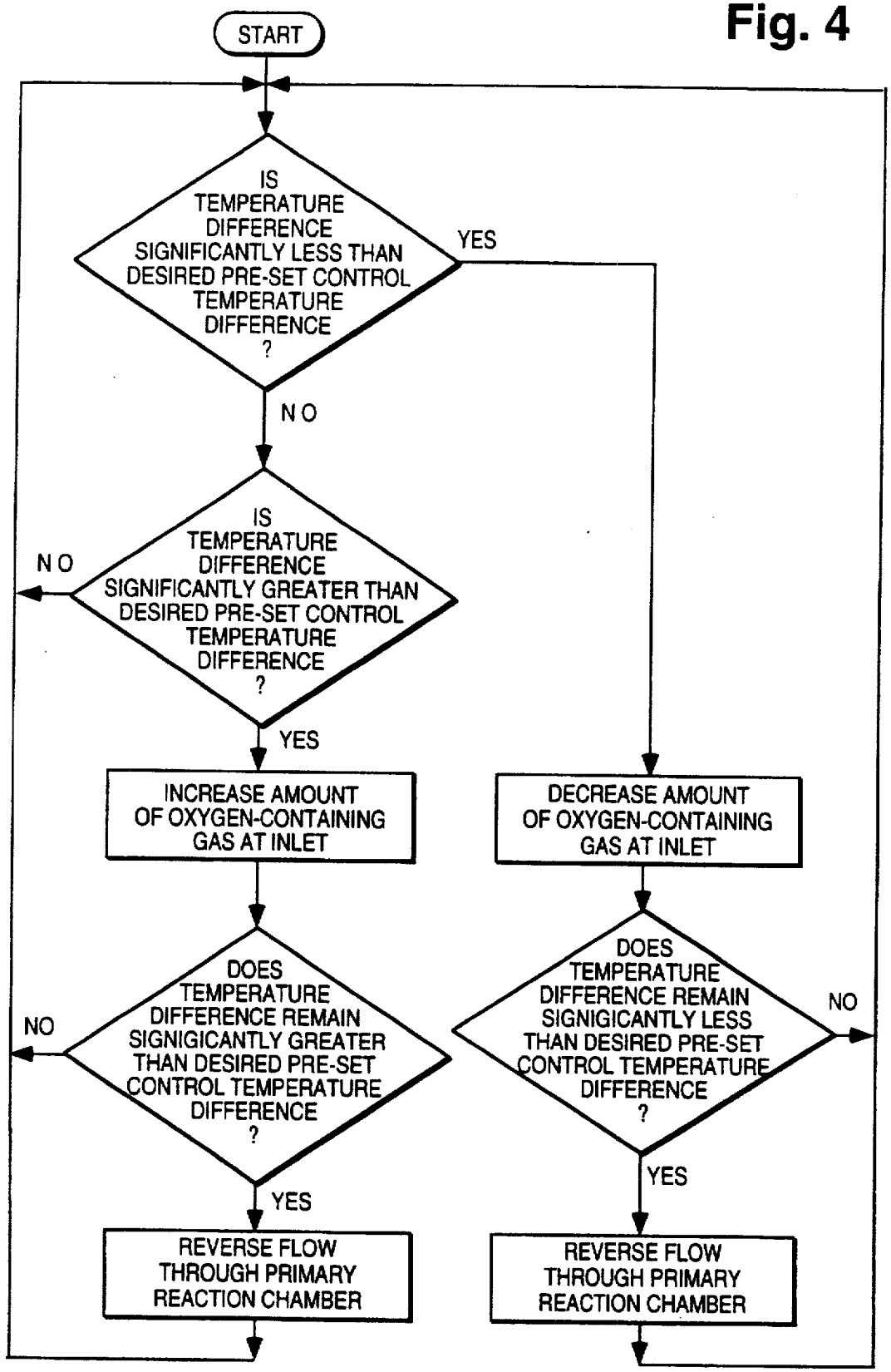
FIG. 4 is a process flow diagram of the control strategy based upon temperature difference for the present two-stage selective oxidation method.

Control of the present selective oxidizer is effected through the use of a control scheme based upon temperature difference, a flowchart of which is presented in FIG. 4. In FIG. 1 selective oxidizer 10 is provided with four thermocouples 71, 72, 73, 74. When a gas stream directed through selective oxidizer 10 enters via first inlet conduit 14 and is exhausted via first outlet conduit 16, then thermocouples 73 and 74 are used for control of selective oxidizer 10. When a gas stream directed through selective oxidizer 10 enters via second inlet conduit 15 and is exhausted via second outlet conduit 17, then thermocouples 71 and 72 are used for control.

The temperature near the end of primary reaction chamber 11 is measured by thermocouple 73, and is compared with the temperature measured by thermocouple 74 at first outlet conduit 16. If the temperature difference measured by thermocouples 73 and 74 is significantly greater than a pre-set control temperature difference, then an increase in the carbon monoxide concentration of the gaseous fuel stream exiting through first outlet conduit 16 is indicated. In response to this increase in carbon monoxide concentration, control valve 24 will be actuated to increase the amount of oxygen-containing gas mixed with the gaseous fuel stream prior to first inlet conduit 14. The change in oxygen-containing gas flow is proportional to the extent to which the measured temperature difference is greater than the defined pre-set control temperature difference. As a result of the increase in the amount of oxygen-containing gas mixed with the gaseous fuel stream, the temperature difference measured by thermocouples 73, 74 will decrease to be substantially equivalent to the pre-set control temperature difference, thereby indicating a return to acceptable levels of carbon monoxide concentration in the fuel gas exiting first outlet conduit 16, preferably less than about 5 ppm. The preferred pre-set control temperature difference increases as the flow rate of the gaseous fuel stream increases.

Likewise, if the temperature difference detected by thermocouples 73, 74 is significantly less than the pre-set control temperature difference, then again an increase in the concentration of carbon monoxide in the fuel gas stream exiting selective oxidizer 10 via first outlet conduit 16 is indicated. In response to this increase, control valve 24 will be actuated to decrease the amount of oxygen-containing gas mixed with the gaseous fuel stream prior to being directed to first inlet conduit 14. As a result of the decrease in the amount of oxygen-containing gas mixed with the gaseous fuel stream, the temperature difference measured by thermocouples 73, 74 will increase to become substantially equivalent to the pre-set control temperature difference, thereby indicating a return to acceptable levels of carbon monoxide concentration in the gaseous fuel stream exiting first outlet conduit 16.

The effect of changing the amount of oxygen-containing gas mixed with the inlet gaseous fuel stream is to change the rate of the selective oxidation reaction occurring at the inlet portion of the bed or reaction chamber as compared to the outlet portion of the bed. As the amount of oxygen-containing gas is increased for a fixed gaseous fuel stream flow, the reaction rate is increased in the beginning of the bed. Because the inlet gaseous fuel stream contains a certain amount of carbon monoxide, as the selective oxidation reaction rate increases at the beginning of the bed, a smaller amount of carbon monoxide is present in the downstream portion of the bed. The decrease in the amount of carbon monoxide reduces the amount of heat evolved in the downstream portion of the bed, thereby reducing the temperature rise measured by the thermocouples. Decreasing the amount of oxygen-containing gas reduces the reaction rate at the beginning of the bed, thereby leaving more carbon monoxide to reach the downstream portion of the bed, which increases the selective oxidation reaction rate at the downstream portion, and hence the temperature difference measured by the thermocouples increases with the increased heat released. In each case, the temperature difference is the controlling measurement, independent of the absolute temperature measured by each thermocouple. Therefore, an increase in the temperature difference does not necessarily indicate an increase in the absolute temperature measured by each thermocouple as a result of changing the amount of oxygen-containing gas mixed with the gaseous fuel stream.

Experience shows that with the proper amount of oxygen-containing gas, the peak temperature of the selective oxidation reaction occurs just before or at the end of the bed. Under these conditions, the amount of carbon monoxide in the outlet stream will be minimized. The temperature difference is an indicator as to the location of the peak bed temperature. If the temperature difference is significantly more or less than the desired pre-set control temperature difference, the amount of carbon monoxide in the outlet stream will be greater than optimal. The use of a single thermocouple would not indicate the location of the peak temperature.

Referring again to FIG. 1, regulating the amount of oxygen-containing gas mixed with the gaseous fuel stream in response to the difference between the temperatures measured near the end of primary reaction chamber 11 and measured at first outlet conduit 16, diminishes the carbon monoxide concentration of the fuel gas stream exiting through first outlet conduit 16 to below about 5 ppm so long as the increase in the carbon monoxide concentration is not due to carbon monoxide blanketing of the catalyst 18 in reaction chamber 11. When regulation of the amount of oxygen-containing gas mixed with the gaseous fuel stream is ineffective in correcting significant differences between the measured temperature difference and the pre-set control temperature difference, then the increase in the carbon monoxide concentration of fuel gas exiting first outlet conduit 16 is due to carbon monoxide blanketing of a significant amount of the selective oxidation catalyst 18. In this case, control valve 25 and control valve 26 will be actuated to close, while control valve 27 and control valve 28 will be actuated to open, thereby reversing the flow through selective oxidizer 10 and counteracting carbon monoxide blanketing of the catalyst.

When flow through selective oxidizer 10 enters via second inlet conduit 15 and exits via second inlet conduit 17, then thermocouples 71, 72 are used for control in the same manner as discussed above regarding thermocouples 73, 74.

In the previous discussion, the control thermocouples were located such that one was located toward the end of the reaction bed, usually at the point about 90% down the bed length as measured from the bed inlet, and the other thermocouple in the outlet gas stream outside the catalyst bed. The control strategy employing these thermocouples also applies in the situation where both thermocouples are located in the catalyst bed. In this instance, the thermocouples are placed at the points about 60% and about 90%, respectively, of the bed length measured from the bed inlet. Experiments indicate that the latter positioning of the two thermocouples is the preferred configuration.

Figure 2:
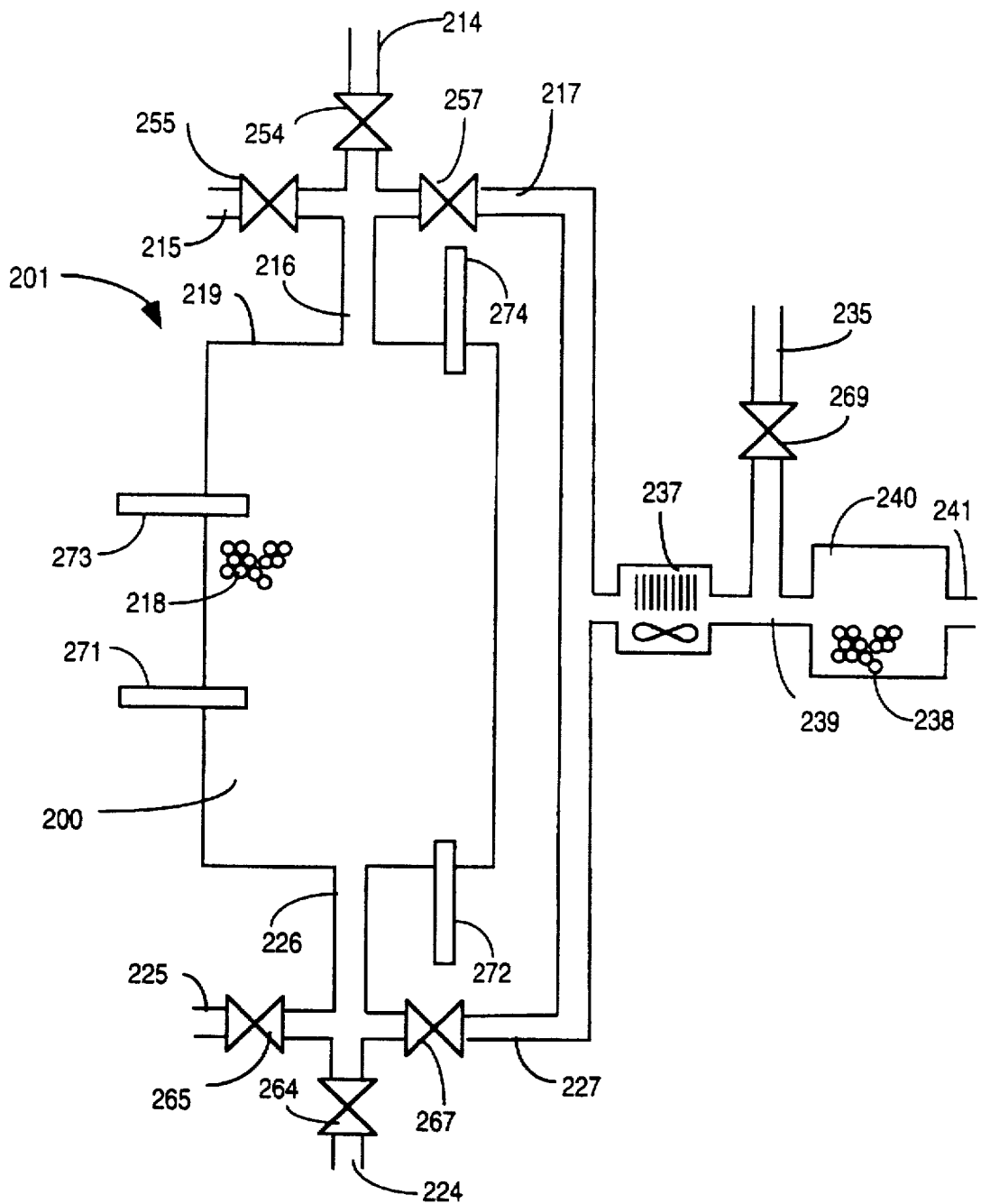
FIG. 2 is a schematic diagram of a second embodiment of the selective oxidation apparatus in which the primary and secondary reaction chambers are separately housed.

Turning now to FIG. 2, a schematic diagram shows an embodiment of two-stage selective oxidizer apparatus 201 in which two discrete reaction chambers are employed. Primary reaction chamber 200 has an amount of selective oxidation catalyst 218 disposed therein. In addition, selective oxidizer 201 has a first gaseous fuel stream inlet conduit 214, a first oxygen-containing gas stream inlet conduit 215, a first outlet conduit 227, a second gaseous fuel stream inlet conduit 224, a second oxygen-containing gas stream inlet conduit 225, and a second outlet conduit 217. Control valve 254 regulates the flow through first gaseous fuel stream conduit 214. Control valve 255 regulates the flow through first oxygen-containing gas stream inlet conduit 215. Control valve 267 regulates the flow through first outlet conduit 227. Control valve 264 regulates the flow through second gaseous fuel stream conduit 224. Control valve 265 regulates the flow through second oxygen-containing gas stream inlet conduit 225. Control valve 257 regulates the flow through second outlet conduit 217. A common conduit 216 provides a fluid connection between first inlet conduits 214, 215 and primary reaction chamber 200, as well as between reaction chamber 200 and second outlet conduit 217. Similarly, a common conduit 226 provides a fluid connection between second inlet conduits 224, 225 and primary reaction chamber 200, as well as between reaction chamber 200 and first outlet conduit 227.

FIG. 2 also shows that secondary reaction chamber 240 has an amount of selective oxidation catalyst 238 disposed therein. Secondary reaction chamber 240 also has a secondary inlet conduit 239 and a secondary outlet conduit 241. Secondary inlet conduit 239 is in fluid communication with first outlet conduit 227 and second outlet conduit 217. An optional secondary oxygen-containing gas stream inlet conduit 235 is also in fluid communication with secondary inlet conduit 239. A control valve 269 regulates the flow through secondary oxygen-containing gas stream inlet conduit 235. An optional heat exchanger 237 is interposed in secondary inlet conduit 239 to remove heat, as necessary, from the gas stream flowing through secondary inlet conduit 239.

In operation, a gaseous fuel stream comprising hydrogen and carbon monoxide is flowed in first inlet conduit 214 via control valve 254. The gaseous fuel stream in first inlet conduit 214 is mixed with an amount of oxygen-containing gas which is fed through first oxygen-containing gas inlet conduit 215 via control valve 255. The mixture of fuel gas and oxygen-containing gas is fed into primary reaction chamber 200 through common conduit 216, and is contacted with at least a portion of selective oxidation catalyst 218. Once selective oxidation has taken place, the gaseous fuel stream, which at that point has a very low carbon monoxide concentration (less than about 5 ppm), exits primary reaction chamber 200 through common conduit 226 and first outlet conduit 227 via control valve 267.

If an increase is detected in carbon monoxide concentration of the gaseous fuel stream exiting primary reaction chamber 200 due to carbon monoxide blanketing of selective oxidation catalyst 218, then the flow through primary reaction chamber 200 is reversed. When the flow through primary reaction chamber 200 is reversed, the gaseous fuel stream comprising hydrogen and carbon monoxide is directed through second inlet conduit 224 via control valve 264. The gaseous fuel stream in second inlet conduit 224 is mixed with an amount of oxygen-containing gas which is fed through second inlet conduit 225 via control valve 265. The mixture of gaseous fuel and oxygen-containing gas is fed into primary reaction chamber 200 through common conduit 226, and is contacted with at least a portion of selective oxidation catalyst 218. Once selective oxidation has taken place, the gaseous fuel stream, which at that point has a very low carbon monoxide concentration (less than about 5 ppm), exits primary reaction chamber 200 through common conduit 216 and second outlet conduit 217 via control valve 257.

When control valves 254, 255, 267 are actuated to be passable to fluid flow, then control valves 257, 264, 265 are actuated not to be passable to fluid flow. Conversely, when control valves 257, 264, 265 are actuated to be passable to fluid flow, then control valves 254, 255, 267 are actuated not to be passable to fluid flow.

The outlet gas stream from primary reaction chamber 200 is directed from either outlet conduit 217 or outlet conduit 227 to secondary inlet conduit 239. In secondary inlet conduit 239, the outlet gas stream receives an optional further amount of a secondary oxygen-containing gas stream from inlet conduit 235 via control valve 269. Optional heat exchanger 237 interposed in secondary inlet conduit 239 removes heat, as necessary, from the outlet gas stream flowing through secondary inlet conduit 239.

According to the temperature based control scheme depicted in FIG. 4, flow reversal through primary reaction chamber 200 of FIG. 2, and activation/deactivation of flow through secondary reaction chamber 240 is effected through use of control valves 254, 255, 257, 264, 265, 267, as well as thermocouples 271, 272, 273, 274.

When the direction of the flow through primary reaction chamber 200 is from first inlet conduits 214, 215 to first outlet conduit 227, the temperature near the end of primary reaction chamber 200 is measured by thermocouple 271 and is compared with the temperature at first outlet conduit 227, as measured by thermocouple 272. If the temperature difference is significantly lower than the pre-set control temperature difference, then an increase in the carbon monoxide concentration of the gaseous fuel stream exiting at first outlet conduit 227 is indicated. In response to this increase in carbon monoxide concentration, first control valve 255 will be actuated to decrease the amount of oxygen-containing gas mixed with the gaseous fuel stream. As a result of the decrease in the amount of oxygen-containing gas mixed with the gaseous fuel stream, the measured temperature difference will increase such that there is little difference between the measured temperature difference and the preset control temperature difference, thereby indicating a return to acceptable levels of carbon monoxide concentration in the fuel gas exiting through first outlet conduit 227.

Likewise, if the measured temperature difference is significantly greater than the pre-set control temperature difference, then again an increase in the carbon monoxide concentration of the fuel gas stream exiting through first outlet conduit 227 is indicated. In response to this increase, first control valve 255 is actuated to increase the amount of oxygen-containing gas mixed with the gaseous fuel stream. As a result of the increase in the amount of oxygen-containing gas mixed with the gaseous fuel stream the measured temperature difference will decrease such that there is little difference between the measured temperature difference and the pre-set control temperature difference, thereby indicating a return to acceptable levels of carbon monoxide concentration in the fuel gas stream exiting through first outlet conduit 227.

Regulation of the amount of oxygen-containing gas mixed with the gaseous fuel stream in response to temperature difference diminishes the carbon monoxide concentration of fuel gas stream exiting through first outlet conduit 227 to below about 5 ppm so long as the increase in carbon monoxide concentration is not due to blanketing of catalyst 218 by carbon monoxide. The inability to regulate the measured temperature differences by increasing or decreasing the amount of oxygen-containing gas mixed with the gaseous fuel stream, indicates that the flow through primary reaction chamber 200 should be reversed to counteract the carbon monoxide blanketing and regenerate amount of catalyst 218. When flow through primary reaction chamber 200 is between second inlet conduits 224, 225 and second outlet conduit 217, then thermocouples 273, 274 are used for control in the same manner as discussed above for thermocouples 271, 272.

Immediately after the flow through primary reaction chamber 200 is reversed, the portion of the gaseous fuel stream initially exiting primary reaction chamber 200 has a relatively high carbon monoxide concentration (e.g. 2000 ppm) because at the point of flow reversal it had not yet contacted selective oxidation catalyst 218. Secondary reaction chamber 240 oxidizes this as-yet unreacted carbon monoxide and prevents fuel gas with a high carbon monoxide concentration from exiting selective oxidizer 201 and entering the associated fuel cell assembly (not shown in FIG. 2).

Further reversal in the direction of the flow through primary reaction chamber 200 may be repeated as often as necessary.

Figure 3:
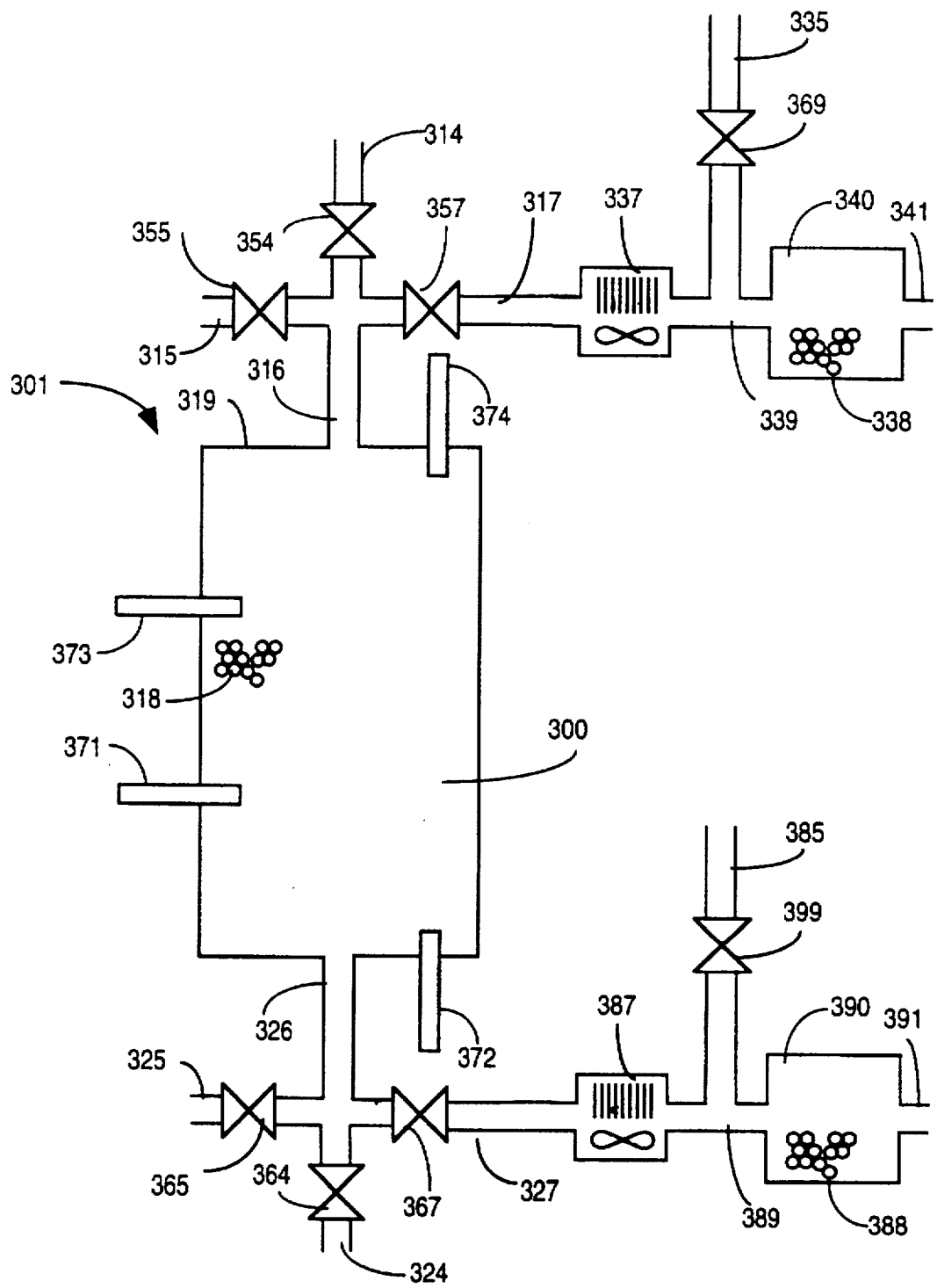
FIG. 3 is a schematic diagram of a third embodiment of the selective oxidation apparatus in which the primary reaction chamber and two secondary reaction chambers are each separately housed.

Turning now to FIG. 3, a schematic diagram shows an embodiment of two-stage selective oxidizer apparatus 301 in which three discrete reaction chambers are employed. Primary reaction chamber 300 has an amount of selective oxidation catalyst 318 disposed therein. In addition, selective oxidizer 301 has a first gaseous fuel stream inlet conduit 314, a first oxygen-containing gas stream inlet conduit 315, a first outlet conduit 327, a second gaseous fuel stream inlet conduit 324, a second oxygen-containing gas stream inlet conduit 325, and a second outlet conduit 317. Control valve 354 regulates the flow through first gaseous fuel stream conduit 314. Control valve 355 regulates the flow through first oxygen-containing gas stream inlet conduit 315. Control valve 367 regulates the flow through first outlet conduit 327. Control valve 364 regulates the flow through second gaseous fuel stream conduit 324. Control valve 365 regulates the flow through second oxygen-containing gas stream inlet conduit 325. Control valve 357 regulates the flow through second outlet conduit 317. A common conduit 316 provides a fluid connection between first inlet conduits 314, 315 and primary reaction chamber 300, as well as between reaction chamber 300 and second outlet conduit 317. Similarly, a common conduit 326 provides a fluid connection between second inlet conduits 324, 325 and primary reaction chamber 300, as well as between reaction chamber 300 and first outlet conduit 327.

FIG. 3 also shows that a secondary reaction chamber 390 has an amount of selective oxidation catalyst 388 disposed therein. Secondary reaction chamber 390 also has a secondary inlet conduit 389 and a secondary outlet conduit 391. Secondary inlet conduit 389 is in fluid communication with first outlet conduit 327. An optional secondary oxygen-containing gas stream inlet conduit 385 is also in fluid communication with secondary inlet conduit 389. A control valve 399 regulates the flow through secondary oxygen-containing gas stream inlet conduit 385. An optional heat exchanger 387 is interposed in secondary inlet conduit 389 to remove heat, as necessary, from the gas stream flowing through secondary inlet conduit 389.

FIG. 3 further shows that a secondary reaction chamber 340 has an amount of selective oxidation catalyst 338 disposed therein. Secondary reaction chamber 340 also has a secondary inlet conduit 339 and a secondary outlet conduit 341. Secondary inlet conduit 339 is in fluid communication with second outlet conduit 317. An optional secondary oxygen-containing gas stream inlet conduit 335 is also in fluid communication with secondary inlet conduit 339. A control valve 369 regulates the flow through secondary oxygen-containing gas stream inlet conduit 335. An optional heat exchanger 337 is interposed in secondary inlet conduit 339 to remove heat, as necessary, from the gas stream flowing through secondary inlet conduit 339.

In operation, a gaseous fuel stream comprising hydrogen and carbon monoxide is flowed in first inlet conduit 314 via control valve 354. The gaseous fuel stream in first inlet conduit 314 is mixed with an amount of oxygen-containing gas which is fed through first oxygen-containing gas inlet conduit 315 via control valve 355. The mixture of fuel gas and oxygen-containing gas is fed into primary reaction chamber 300 through common conduit 316, and is contacted with at least a portion of selective oxidation catalyst 318. Once selective oxidation has taken place, the gaseous fuel stream, which at that point has a very low carbon monoxide concentration (less than about 5 ppm), exits primary reaction chamber 300 through common conduit 326 and first outlet conduit 327 via control valve 367.

If an increase is detected in carbon monoxide concentration of the gaseous fuel stream exiting primary reaction chamber 300 due to carbon monoxide blanketing of selective oxidation catalyst 318, then the flow through primary reaction chamber 300 is reversed. When the flow through primary reaction chamber 300 is reversed, the gaseous fuel stream comprising hydrogen and carbon monoxide is directed through second inlet conduit 324 via control valve 364. The gaseous fuel stream in second inlet conduit 324 is mixed with an amount of oxygen-containing gas which is fed through second inlet conduit 325 via control valve 365. The mixture of gaseous fuel and oxygen-containing gas is fed into primary reaction chamber 300 through common conduit 326, and is contacted with at least a portion of selective oxidation catalyst 318. Once selective oxidation has taken place, the gaseous fuel stream, which at that point has a very low carbon monoxide concentration (less than about 5 ppm), exits primary reaction chamber 300 through common conduit 316 and second outlet conduit 317 via control valve 357.

When control valves 354, 355, 367 are actuated to be passable to fluid flow, then control valves 357, 364, 365 are actuated not to be passable to fluid flow. Conversely, when control valves 357, 364, 365 are actuated to be passable to fluid flow, then control valves 354, 355, 367 are actuated not to be passable to fluid flow.

The outlet gas stream from primary reaction chamber 300 is directed from first outlet conduit 327 to secondary inlet conduit 389. In secondary inlet conduit 389, the outlet gas stream receives an optional further amount of a secondary oxygen-containing gas stream from inlet conduit 385 via control valve 399. Optional heat exchanger 387 interposed in secondary inlet conduit 389 removes heat, as necessary, from the outlet gas stream flowing through secondary inlet conduit 389.

The outlet gas stream from primary reaction chamber 300 is directed from second outlet conduit 317 to secondary inlet conduit 339. In secondary inlet conduit 339, the outlet gas stream receives an optional further amount of a secondary oxygen-containing gas stream from inlet conduit 335 via control valve 369. Optional heat exchanger 337 interposed in secondary inlet conduit 339 removes heat, as necessary, from the outlet gas stream flowing through secondary inlet conduit 339.

According to the temperature based control scheme depicted in FIG. 4, flow reversal through primary reaction chamber 300 of FIG. 3, and activation/deactivation of flow through secondary reaction chambers 340, 390 is effected through use of control valves 354, 355, 357, 364, 365, 367, as well as thermocouples 371, 372, 373, 374.

When the direction of the flow through primary reaction chamber 300 is from first inlet conduits 314, 315 to first outlet conduit 327, the temperature near the end of primary reaction chamber 300 is measured by thermocouple 371 and is compared with the temperature at first outlet conduit 327, as measured by thermocouple 372. If the temperature difference is significantly lower than the pre-set control temperature difference, then an increase in the carbon monoxide concentration of the gaseous fuel stream exiting at first outlet conduit 327 is indicated. In response to this increase in carbon monoxide concentration, first control valve 355 will be actuated to decrease the amount of oxygen-containing gas mixed with the gaseous fuel stream. As a result of the decrease in the amount of oxygen-containing gas mixed with the gaseous fuel stream, the measured temperature difference will increase such that there is little difference between the measured temperature difference and the preset control temperature difference, thereby indicating a return to acceptable levels of carbon monoxide concentration in the fuel gas exiting through first outlet conduit 327.

Likewise, if the measured temperature difference is significantly greater than the pre-set control temperature difference, then again an increase in the carbon monoxide concentration of the fuel gas stream exiting through first outlet conduit 327 is indicated. In response to this increase, first control valve 355 is actuated to increase the amount of oxygen-containing gas mixed with the gaseous fuel stream. As a result of the increase in the amount of oxygen-containing gas mixed with the gaseous fuel stream the measured temperature difference will decrease such that there is little difference between the measured temperature difference and the pre-set control temperature difference, thereby indicating a return to acceptable levels of carbon monoxide concentration in the fuel gas stream exiting through first outlet conduit 327.

Regulation of the amount of oxygen-containing gas mixed with the gaseous fuel stream in response to temperature difference diminishes the carbon monoxide concentration of fuel gas stream exiting through first outlet conduit 327 to below about 5 ppm so long as the increase in carbon monoxide concentration is not due to blanketing of catalyst 318 by carbon monoxide. The inability to regulate the measured temperature differences by increasing or decreasing the amount of oxygen-containing gas mixed with the gaseous fuel stream, indicates that the flow through primary reaction chamber 300 should be reversed to counteract the carbon monoxide blanketing and regenerate amount of catalyst 318. When flow through primary reaction chamber 300 is between second inlet conduits 324, 325 and second outlet conduit 317, then thermocouples 373, 374 are used for control in the same manner as discussed above for thermocouples 371, 372.

Immediately after the flow through primary reaction chamber 300 is reversed, the portion of the gaseous fuel stream initially exiting primary reaction chamber 300 has a relatively high carbon monoxide concentration (e.g., 2000 ppm) because at the point of flow reversal it had not yet contacted selective oxidation catalyst 318. Secondary reaction chambers 340, 390 oxidize this as-yet unreacted carbon monoxide and prevent fuel gas with a high carbon monoxide concentration from exiting selective oxidizer 301 and entering the associated fuel cell assembly (not shown in FIG. 3).

Further reversal in the direction of the flow through primary reaction chamber 300 may be repeated as often as necessary.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An apparatus for selectively oxidizing carbon monoxide to carbon dioxide in a fuel stream comprising hydrogen and carbon monoxide, said apparatus comprising:
   (a) a primary reaction chamber comprising a primary catalyst bed for promoting oxidation of carbon monoxide to carbon dioxide, said primary reaction chamber further comprising:
      (i) a first inlet and a first outlet, said first inlet fluidly connected to said first outlet for directing said fuel stream through said primary catalyst bed in a first direction;
      (ii) a second inlet and a second outlet, said second inlet fluidly connected to said second outlet for directing said fuel stream through said primary catalyst bed in a second direction, wherein said second direction is substantially the reverse of said first direction;

said apparatus further comprising:
   (b) a flow controller for iteratively switching said flow direction of said fuel stream through said primary catalyst bed between said first flow direction and said second flow direction.

2. The apparatus of claim 1, wherein said flow controller comprises:
(i) a first valve mechanism for rendering said first inlet and said first outlet substantially impassable to fluid flow when said second inlet and said second outlet are passable to fluid flow; and
(ii) second valve mechanism for rendering said second inlet and said second outlet substantially impassable to fluid flow when said first inlet and said first outlet are passable to fluid flow.

3. The apparatus of claim 1, wherein said first inlet is adjacent said second outlet, said second inlet is adjacent said first outlet.

4. The apparatus of claim 1, wherein said first inlet coincides with said second outlet, as said second inlet coincides with said first outlet.

5. The apparatus of claim 1, wherein said first inlet is fluidly connected to a first gaseous fuel stream inlet conduit and to a first oxygen-containing gas stream inlet conduit, and said second inlet is fluidly connected to a second gaseous fuel stream inlet conduit and to a second oxygen-containing gas stream inlet conduit.

6. The apparatus of claim 5, said apparatus further comprising a first oxygen flow control valve for regulating the flow of said oxygen-containing gas stream through said first oxygen-containing gas stream inlet conduit, and a second oxygen flow control valve for regulating the flow of said oxygen-containing gas stream through said second oxygen-containing gas stream inlet conduit.

7. The apparatus of claim 1, said apparatus further comprising a secondary reaction chamber, said secondary reaction chamber comprising a secondary catalyst bed for promoting oxidation of carbon monoxide to carbon dioxide, said secondary catalyst bed fluidly connected to said primary catalyst bed, for receiving said fuel stream from said primary catalyst bed.

8. The apparatus of claim 7, wherein said secondary catalyst bed is fluidly connected to each of said first outlet and said second outlet, for receiving said fuel stream from said primary catalyst bed.

9. The apparatus of claim 7, said apparatus comprising:

(c) a first secondary reaction chamber comprising a first secondary catalyst bed for promoting oxidation of carbon monoxide to carbon dioxide, said first secondary catalyst bed fluidly connected to said first outlet, for receiving said fuel stream from said primary catalyst bed;
(d) a second secondary reaction chamber comprising a second secondary catalyst bed for promoting oxidation of carbon monoxide to carbon dioxide, said second secondary catalyst bed fluidly connected to said second outlet, for receiving said fuel stream from said primary catalyst bed.

10. The apparatus of claim 9, wherein said first secondary reaction chamber further comprises a first secondary outlet, and said second secondary reaction chamber further comprises a second secondary outlet, and said flow controller comprises:
(i) a first valve mechanism for rendering said first inlet and said first secondary outlet substantially impassable to fluid flow when said second inlet and said second secondary outlet are passable to fluid flow; and
(ii) a second valve mechanism for rendering said second inlet and said second secondary outlet substantially impassable to fluid flow when said first inlet and said first secondary outlet are passable to fluid flow.

11. The apparatus of claim 7, wherein said first reaction chamber and said secondary reaction chamber are discrete chambers.

12. The apparatus of claim 11, wherein said secondary reaction chamber further comprises a secondary inlet, said secondary inlet fluidly connected to at least one of said first outlet and said second outlet, and to a secondary oxygen-containing gas stream inlet conduit.

13. The apparatus of claim 12, said apparatus further comprising a secondary oxygen flow control valve for regulating the flow of said oxygen-containing gas stream through said secondary oxygen-containing gas stream inlet conduit.

14. The apparatus of claim 11, said apparatus further comprising a heat exchanger interposed between said primary catalyst bed and said secondary catalyst bed, for adjusting the temperature of said fuel stream.

* * * * *